June 25, 1957  J. L. GRATZMULLER  2,796,856
AUTOMATICALLY RELEASABLE COUPLING
Filed July 29, 1953  2 Sheets-Sheet 1
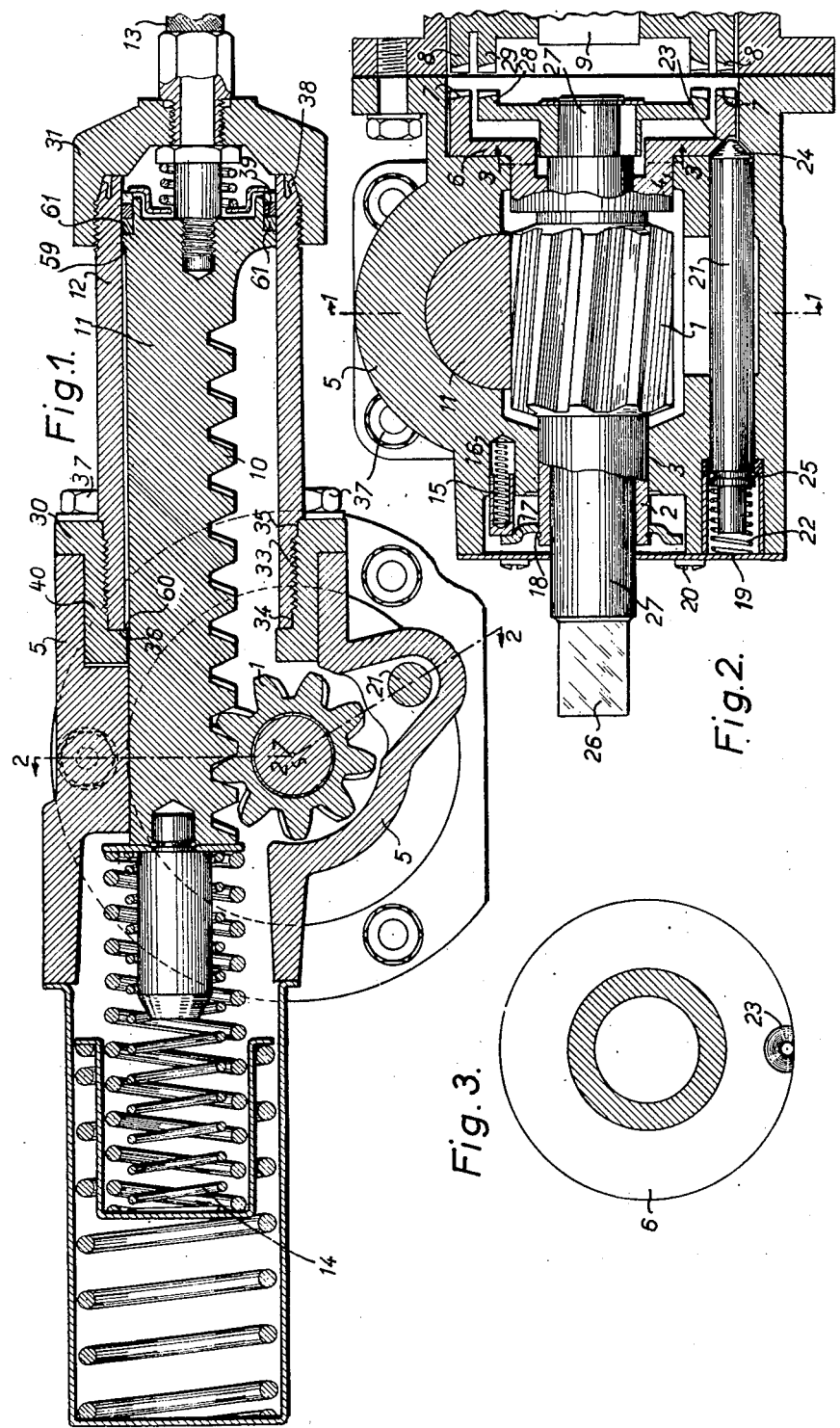

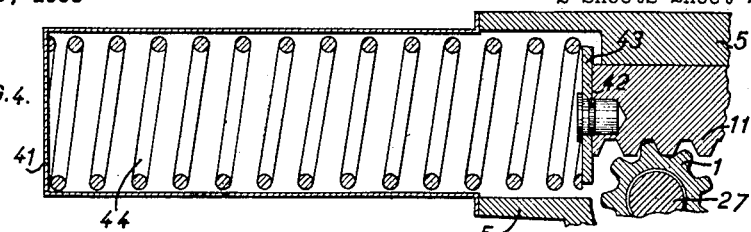
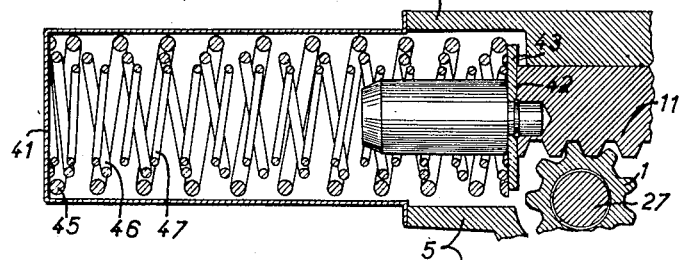
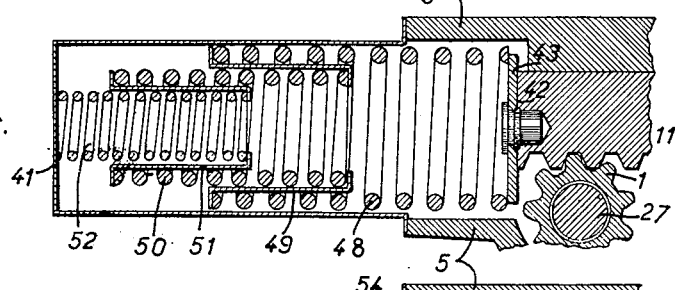
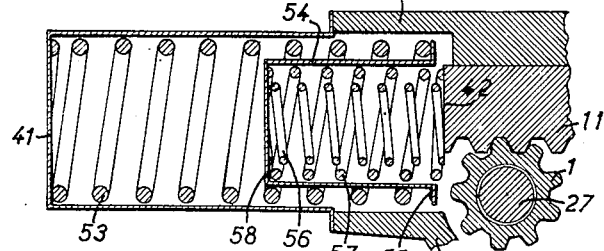
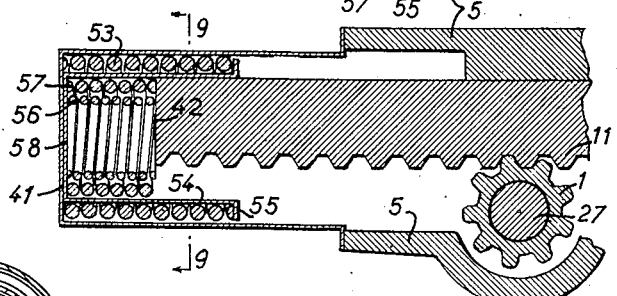
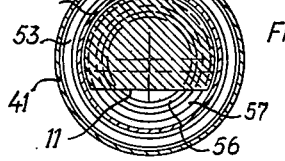

United States Patent Office 2,796,856
Patented June 25, 1957

---

2,796,856

AUTOMATICALLY RELEASABLE COUPLING

Jean Louis Gratzmuller, Paris, France

Application July 29, 1953, Serial No. 371,007

Claims priority, application France August 6, 1952

14 Claims. (Cl. 123—179)

This invention relates to couplings of the type comprising a driving and a driven coaxial rotary members, both provided with dog-teeth or similar positive clutching elements adapted to be interengaged upon axial displacement of said driving member to clutch the same with said driven member. Such couplings are used, for example, between the starter of an internal combustion engine and the crank-shaft of said engine.

In most known couplings of this type, ratchet means, which are often constituted by the interengageable dog-teeth proper, are interposed in the coupling to permit the driven member to rotate while the driving member is at rest or rotates in opposite direction. This gives rise to relative friction, wear and noise which is particularly objectionable when the driven member rotates alone during a very long time, while the periods during which it is rotated from the driving member are very short e. g. in the case of starters.

This invention has for one of its purposes to ensure a complete disengagement of said driving member from said driven member in at least one resting position of the former.

With this purpose in view, an object of the invention is to provide a coupling of the type described, including an automatic declutching mechanism essentially comprising elastic means continuously urging its driving member into disengagement from its driven member, an automatic clutching mechanism including elastic means stronger than those of said declutching mechanism to bring said driving member into interengagement with said driven member against the action of said declutching mechanism and means rotatively fast with said driving member to prevent said clutching mechanism from operating in at least one resting angular position of said driving member.

With this arrangement, when said driving member is in said resting position, it is subjected only to the action of the declutching elastic means and hence held in disengaged position. However, as soon as said driving-member is rotated from said resting position, it becomes subjected to the actions of both declutching and clutching mechanisms and since the latter prevails upon the former, the driving member is automatically clutched with the driven one. The latter is then rotated under the action of said driving member until the same is brought into a resting angular position again, when the clutching mechanism is once more prevented from acting upon the driving member, so that the device is automatically declutched.

In a particular embodiment of the invention, the automatic clutching mechanism is constituted by a pushing-rod slidable in a direction parallel to the axis of the driving member and the latter is provided with a conical recess having its apex radially spaced from the axis of the coupling by the same distance as the axis of said slidable rod and the latter is provided with a pointed tip adapted to be engaged into the above-mentioned recess, the arrangement being such that when the tip of the slidable rod is engaged into the recess, said rod has reached the end of its active stroke and is prevented from acting upon the driving member of the coupling, while as soon as the latter has been angularly displaced, said rod is expelled out of its recess and exerts on said driving member a thrust capable of bringing it into interengagement with said driven member under the action of clutching elastic means associated with said pushing-rod.

The driving member of the coupling according to the invention, may be rotated from any suitable prime-mover. However, since in many applications, the rotation to be imparted thereto is limited, since the driving member must be capable of axial displacement for clutching and declutching purposes, and last but not least since said driving member must be stopped in a precise angular position to permit declutching, it is particularly interesting and this is accordingly another object of the invention, to actuate said driving member through a rack operated by a source of power and a pinion meshing with said rack and rotatively fast with said driving member.

A more particular object of the invention is to provide the pinion and the rack mentioned in the preceding paragraph with teeth slightly inclined in such a manner that, as said rack effects its active stroke, said driving member is not only rotated but also urged axially towards the driven member.

Now elastic means must be obviously provided to return the rack into resting position after operation. In most applications, it is extremely interesting to reduce to a minimum the axial size of said elastic means which are necessarily aligned with the rack.

A further object of the invention is to provide a system including a rack-and-pinion gear associated with a coupling of the type described, further comprising returning means for said rack constituted, in combination, by at least three coaxial springs, at least two of which operate in parallel, while at least another one works in series with the two first. This arrangement permits reducing the axial size of the elastic means, without decreasing the returning force.

As will be explained hereunder, a particularly interesting application of the coupling according to the invention when actuated through a rack-and-pinion gear of the type described, is to be found in hydraulic-pneumatic starters for internal combustion engines. It is accordingly another object of the invention to provide a starter comprising essentially a hydraulic-pneumatic accumulator, a jack fed from said accumulator, the piston of said jack being formed with rack-teeth meshing with a pinion rotatively fast with the driving member of an automatically releasable coupling of the type described having its driven member rotatively fast with the crank shaft of the engine to be started.

It is clear that the above particular objects of the invention relating to the provision of a pinion having inclined teeth to urge the driving member into clutching position, as well as to the reduction of the axial size of the rack returning elastic means will be advantageously combined in a starter of the type described in the preceding paragraph.

A still further object of the invention is to provide in the pinion of such a starter an axial passage to freely accommodate a transmission shaft associated at one end with the driven member of the coupling and operatively connected at its other end with ancillary apparatus such as a hand starting handle, a compressor, etc.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 is an axial sectional view along line 1—1 of Fig. 2 of a one-rack hydraulic starter including an automatically releasable coupling according to the invention;

Fig. 2 is a sectional view along line 2—2 of Fig. 1;

Fig. 3 is a sectional view along line 3—3 of Fig. 2;

Figs. 4 to 8 are axial sectional views showing the design of the elastic system used for returning the rack into resting position, and Fig. 9 is a sectional view along line 9—9 of Fig. 8.

I have described hereunder a hydraulic starter provided with a coupling according to the invention. I am aware that most known starters are equipped with two racks meshing with a common pinion and that it would be extremely difficult from a constructive point of view to combine my coupling with such starters. I will show, however, that a one-rack starter is, actually, the best solution. For this purpose, I will first expose the conditions required for starting a piston internal combustion engine. The main problem to which such starting gives rise is to apply a predetermined torque on the crank-shaft of the engine, said torque being substantially equal to the driving torque of said engine, and to furnish said torque during an anguar displacement of said crank-shaft having a predetermined minimum amplitude which is generally equal to about one complete turn of said crank-shaft, while for constructive reasons, it is usually reduced to a value slightly lower than 360°.

If, as described hereunder, the starter comprises a hydraulic jack having its piston formed with rack-teeth meshing with a pinion rotatively fast with the driving-member of a coupling according to the invention having its driven member keyed on the crank-shaft of the engine to be started, it is clear that the starting torque will be equal to the product of a leverage equal to the radius of the primitive circle of the pinion, by the force exerted on the piston of the jack from the source of hydraulic pneumatic energy used for feeding said jack.

To define the system, it is necessary to take also into account practical considerations making the industrial use of such a starter acceptable. These conditions are: a reasonable compactness and a cost as low as possible, implying the use of materials having also a reasonable unitary price. Furthermore, certain requirements permitting the use of an engine equipped with such a starter in the usual conditions should be met. Among these requirements, experiments have shown that it is indispensable to provide facilities for driving from the engine ancillary apparatus located on either side thereof, which implies access to both ends of the crank-shaft. This requirement is particularly imperative in the case of marine engines, in which one end of the crank-shaft carries a propeller, while the other end is to drive ancillary apparatus, such as a compressor or the like; on the other hand, it is often necessary to accommodate a handle to permit hand-starting.

It will be easily understood that with a starter, fixedly secured on the casing of an engine and including a pinion having a common axis with the crank-shaft of said engine, access can be had to the end of the shaft on which is located the starter only if said pinion is provided with an axial opening to accommodate an auxiliary transmission shaft. Moreover, the latter should have a diameter sufficient to permit transmission of at least a fraction of the engine power. The minimum diameter of such an auxiliary transmission shaft is therefore necessarily determined as a function of the power to be transmitted and, hence, cannot be selected at will. This essential requirement thus implies a minimum diameter of the pinion to be clutched with the crank-shaft.

The hydraulic starters proposed heretofore, comprising two parallel jacks having their pistons formed with rack-teeth, both racks meshing with a common pinion at two diametrically opposed points thereof, are cumbersome, primarily when the pinion is given a large diameter so that if the above requirements are met, a two-rack starter will be prohibitively cumbersome in the direction of the diameter along which the pinion meshes with the racks, while the size of such a starter in a direction right-angled with said diameter is a function of the stroke of the racks that depends in turn on the diameter of the pinion and the amplitude of the angular stroke which is imposed to said pinion, as explained above, by the starting conditions. Moreover, the springs which are necessarily provided to return the pistons of the jacks into resting position, which springs are aligned with the jacks, still increase the overall size of the starter. It is also to be noted that the cost of a two-jack starter is prohibitive in a great proportion of industrial applications, since such a starter not only necessarily includes duplication of certain essential elements, but also requires a perfect synchronisation between the simultaneous actions of the jacks and, hence, expensive accuracy and adjustment.

As will be shown hereunder, a hydraulic starter comprising one single rack and provided with an automatically releasable coupling according to the invention is capable of ensuring safe starting of a piston internal combustion engine, while being materially more compact than all known starters, meeting the same requirements as the latter and having a cost materially lower, while being at least as sturdy.

It will be first shown that, due to the very necessity of giving the pinion a minimum diameter determined by the above-mentioned requirements, it is perfectly useless to provide two racks, in contradistinction with the generally held opinion. As a fatter of fact, the principle of using two racks was based on two considerations. First, it was considered as necessary, in order to avoid stresses right-angled to the axis of the pinion, to act upon the latter at two diametrically opposed points; secondly, it was believed that the teeth of the pinion, if acted upon at only one point, would be subjected to stresses unduly high for usual hard carbon steels. I have found by calculation, as well as by experiments, that a pinion meshing with one single rack formed in the very body of the piston of a jack and guided in suitable bearings, permits a perfect starting without any wear of the elements and without any risk of jamming. It will be shown hereunder that the fatigue of the metal of a rack formed in the piston of a jack is proportional to the hydraulic pressure applied to said piston and does not depend on the diameter of the jack. Consequently, in contradistinction with the generally held opinion, it is vain to increase the number of racks and a one-rack starter is, in fact, the ideal solution.

In order to analyse the working conditions of the rack, it seems useful to make it clear that said rack is subjected to two axial forces, viz. the active force of the power source and the axial component of the reaction, exerted by the teeth of the pinion on the teeth of the rack, both said axial forces subjecting the rack to flexure stresses. According to the modula of the rack-teeth, the spaces between said teeth will be more or less deep, so that the solid portion of the rack will be more or less wide. It is this solid portion of the rack which is subjected to the flexure stresses so that the rack will be more resisting if said portion is thicker, which leads to reducing the module of the teeth. On the other hand, such a reduction of the module decreases the mechanical resistance of the teeth proper. Thus a compromise must be found to determine said module. Moreover, the dimensions of the rack are determined, on the one hand, by the diameter of the jack in which it is mounted and, on the other hand, by the stroke it must traverse. I have shown that racks formed in pistons of different diameters, are homothetic if the above-mentioned compromise is adopted, so that, to determined the module of the teeth, it suffices to take into account the diameter of the jack cylinder. As a matter of fact, wear conditions are negligible due to the limited time and extent of motion of the meshing elements.

I have also found that the maximum hydraulic pressure that the rack is capable of resisting, is constant for a metal of given quality, whatever may be the diameter of the jack cylinder.

The rack being thus determined, the module of the pinion teeth is also determined. Now, it is known that the kinematic conditions of gear design require giving the pinion a minimum of nine teeth; the minimum diameter of the pinion is thus also automatically determined. It is to be noted that, though the base of the teeth of the pinion is thinner than the base of the teeth of the rack, it is easy to obtain the required mechanical resistance by giving the pinion a suitable axial dimension. Since the starting torque is determined as a function of the type of engine to be started, it is then possible to determine automatically the minimum radius of the pinion, as well as the minimum diameter of the jack cylinder, since said torque is equal to the product of the tangential force by said radius.

I have also determined that a pinion calculated in this manner has still a diameter which is too small to permit providing therein an axial passage to accommodate a transmission shaft; said diameter therefore should be increased for this purpose and hence, the number of teeth of the pinion can also be increased, which shows that a second rack may be dispensed with and that a one-rack starter provided with a coupling according to the invention is an ideal solution from the mechanical point of view, as well as from the point of view of the use of engines equipped with such a starter. Since it offers moreover, the further advantage of being more compact, requiring cheaper machining, comprising a smaller number of elements and eliminating the necessity of the delicate adjustment that is indispensable in the case of a two-rack starter, it constitutes, with respect to the latter, a remarkable technical development.

Referring to the drawings, there is shown at 1, a pinion integral with and on a hollow shaft 2 loosely journalled in bearings 3 and 4 of a casing 5, said pinion carrying a dish-shaped disk 6 that constitutes the driving member of the coupling according to the invention and on the edge of which are provided dog-teeth 7 adapted to be operatively interengaged with dog-teeth 8 rotatively fast with the driven shaft 9 which is coaxial with shaft 2. Shaft 2 of pinion 1 is slidably mounted in its bearings in casing 5. In the preferred embodiment shown, pinion 1 meshes with a rack 10 provided on a piston 11 which constitutes, together with a cylinder 12 in which it is slidably mounted, a hydraulic jack fed at 13 with pressure-fluid from, e. g., a hydraulic-pneumatic accumulator (not shown). An elastic system 14 which will be described in detail hereunder, is provided to return the rack-piston 10—11 into resting position.

According to the main feature of the invention, declutching is ensured automatically by one or more devices each comprising a spring 15 housed in a bore 16 provided in casing 5, said spring bearing at one end in the bottom of said bore and at its other end against a floating washer 17 axially fast with shaft 2. With this arrangement, each spring 15 urges continuously the movable assembly comprising pinion 1, shaft 2 and the driving member 6, together with its dog-teeth 7 leftwards, as shown in Fig. 2, i. e. towards declutched position.

In the example shown, the floating washer 17 is made axially fast with shaft 2 in declutching direction by a simple piano wire 18 housed in a groove provided, for this purpose, in the periphery of shaft 2. This arrangement permits easy mounting: the assembly 1, 2, 6 is first introduced from the right (as shown in Fig. 2) whereupon washer 17 and then the piano-wire 18 are introduced from the left. Finally, the left end of the casing is closed by means of a removable plate 19 secured on casing 5, e. g., by means of bolts 20.

With the coupling according to the invention, clutching also is ensured automatically. In the example shown, the clutching mechanism comprises a slidable pushing-rod 21 continuously subjected to the action of a spring 22 which is so calibrated that its action is materially stronger than the counter-acting action of the declutching spring or springs 15. The driving member 6 is provided on its left-hand face (as shown in Fig. 2) with a conical recess 23. The pushing-rod 21 has a conical tip 24 which is engaged into recess 23 when the driving member 6 is in the angular position shown in Fig. 2, which corresponds to the resting position of rack 10, the pushing-rod 21 being then at the end of its active stroke, as also shown in Fig. 2. It will be easily understood that, in this position, spring 22 is made incapable of acting upon the driving member 6, due to the fact that a piano wire 25 housed in a groove near the end of rod 21 then abuts against the bottom of the housing of spring 22 in casing 5. Thus, the spring or springs 15 are no more counter-acted by spring 22 so that they are capable of holding the member 6 in the axial position shown, in which the dog-teeth 7 are completely disengaged from the dog-teeth 8.

As soon as rack 10 is displaced leftwards, as shown in Fig. 1, pinion 1 is imparted with an angular displacement and the conical tip of the pushing rod 21 is pushed out of recess 23, so that spring 22 is compressed and exerts through rod 21 a rightwards thrust on the driving member 6. Since the strength of spring 22 is materially higher than that of spring or springs 15, the driving member 6 is then urged rightwards, as shown in Fig. 2, by such a distance as to ensure full engagement of its dog-teeth 7 in those 8 of the driven shaft 9.

After starting of the engine, the rack 10 is brought into resting position again, so that the conical recess 23 once more assumes the angular position shown in Fig. 2, in which the spring or springs 15 are permitted to move the driving member 6 out of engagement with the driven member of the clutch.

Now, if the stroke of rack 10 is such as to impart to driving member 6 a rotation by one turn, recess 23 will assume the position shown in Fig. 2 at the end of said stroke and the coupling will remain declutched as long as the jack remains in its fully extended position.

According to another feature of the invention, the driving shaft 2 is hollow, as already mentioned, which permits freely accommodating through said shaft, e. g., another driving shaft 27 which, in the example shown, is provided at one end with a polygonal head 26 adapted to receive a handle, while its other end is provided with dog-teeth 28 adapted to cooperate with complementary dog-teeth 29 provided on the driven shaft 9 for hand starting.

It is obviously possible to accommodate, through the axial passage in pinion 1, a shaft continuously fast in rotation with shaft 9, to permit transmitting power from the engine to one or more ancillary driven mechanisms. As mentioned above, pinion 1 has a diameter sufficient to ensure the required starting action by means of one single rack, while providing an axial passage sufficient to accommodate a transmission shaft. On the other hand, pinion 1 may be given any suitable size to accommodate a shaft of any required diameter, this implying, of course, a certain increase of the general dimensions of the whole assembly, since an augmentation of the diameter of the pinion requires a corresponding augmentation of the length of the rack and hence of the jack.

According to another feature of the invention, the elastic system provided for returning rack 10 into resting position is so designed as to be as compact as possible, which permits in particular, if required, to increase the length of the jack without giving to the whole assembly prohibitive dimensions.

In Figs. 1 and 4 to 9, are shown some constructive embodiments of elastic systems illustrating the advantages of the arrangements according to the invention.

Fig. 4 shows a conventional drawback elastic system comprising only one spring 44, having its axis aligned with the jack, said spring being housed between the bottom of a tubular casing 41 and the end 42 of the piston. Spring 44 acts upon the end 42 of piston 11 through a washer 43. The axial size of such a device, in a specific case which has been chosen as an illustration, reaches 216 mm. (about 8 and 3/5 inches).

In Fig. 5, is shown a first improvement in which three coaxial springs 45, 46 and 47 are substituted for the single spring 44 of Fig. 4. This three-springs arrangement permits reducing the axial size of the system, in the same specific example, to 184.5 mm. (about 7 4/10 inches), other things being equal.

In Fig. 6, is shown an alternative embodiment comprising three coaxial return springs, in which said springs, instead of working in parallel as in Fig. 5, are mounted in series; for this purpose, a first spring 48 is interposed between washer 43 and an outer flange provided at one end of a movable tubular member 49, a second spring 50 disposed inside spring 48 is interposed between an inner flange provided at the other end of said movable tubular member 49 and the outer flange of a second movable tubular member 51 and, finally a third spring 52 is interposed between the inner flange of the last-mentioned movable tubular member 51 and the bottom of the fixed tubular casing 41. This arrangement permits reducing the axial size of the drawback system, in the same specific case, to 182 mm. (about 7 3/10 inches).

Now, the applicant has found that if, while using three springs, the same are adapted to work neither in series nor in parallel, but according to a special series-parallel arrangement, the whole assembly can be made considerably more compact.

To this effect, according to the invention, a first spring, having a comparatively large cross section, is combined with two other coaxial springs of lower cross-section, so that these two latter springs work in parallel, while this spring pair works in series with the first-mentioned spring.

This arrangement permits an optimum efficiency of the three springs and a maximum reducing of the axial size which is thus reduced, again in the same specific case, to 178.6 mm. (about 7 inches). Such an arrangement is shown in Fig. 1.

In a preferred embodiment of the invention, the axial size is still more reduced as shown in Figs. 7, 8 and 9. In this embodiment, the diameter of the outer spring 53 is such that the end 42 of the rack may be engaged therein. The system further comprises a movable tubular member 54, said spring 53 bearing at one end directly on the bottom of the tubular casing 41 in the annular space provided between the cylindrical wall of the same and the cylindrical wall of the tubular member 54. At its other end, spring 53 bears on the outer flange 55 of the movable tubular member 54, while two other springs 56 and 57 are interposed between the bottom 58 of the tubular movable member 54 and the end 42 of the rack.

As shown in Fig. 8, at the end of the active stroke of the rack, the end 42 of said rack is engaged into the movable tubular member 54, so that if the three springs 53, 56 and 57 are so calibrated that all of them are fully compressed, the axial size of the elastic drawback system is effectively reduced to the axial length of the spring pair 56–57, when fully compressed. If this preferred arrangement is compared with the other systems described, it is found that, again things being equal, the axial size is reduced to 156 mm. (about 6 1/5 inches). It is to be noted furthermore that the additional length introduced by the elastic system is, as a matter of fact, in the example of Fig. 7, 8 and 9, of only 36 mm., instead of 96 mm. in the case of Fig. 4. The reduction thus obtained reaches 63%. It may be also pointed out, that this arrangement is made possible by the use of one single rack, which permits providing the space required therefor at the end of the jack. The apparatus partly shown in Figs. 7 and 8 thus offers a symmetric aspect, the central casing carrying two additional tubular casings aligned with one another, in one of which is housed the jack, while the other one contains the elastic drawback system.

In addition to the essential features described above, there are also provided, according to the invention, a number of additional constructive features, in particular for increasing the mechanical properties of the apparatus, for simplifying the assembling, reducing the cost and avoiding any risk of leakage of the pressure fluid provided for feeding the jack.

A first constructive disposition consists in designing the jack in the shape of a tube 12 provided with two heads 40 and 31, head 40 being provided with an axial passage to accommodate piston 11 and receiving tube 12 which is screwed in the inner threading 33 of said head 40, the centering of tube 12 in head 40 being ensured by two smooth portions 34 and 35 provided on either side of threading 33. The end of tube 12 abuts against an inner shouldering 36 of head 40. The penetration of head 40 into casing 5 is limited by an outer flange 30 of said head. The latter is secured on casing 5 by means of bolts 37. The other head 31 is screwed on the other end of tube 12, the tightness being ensured by a conic seal 38 of the type described in the U. S. patent application Ser. No. 331,017, filed January 13, 1953, by the same applicant, for "Fluid-tight Assembly."

On the other hand, the tightness between piston 11 and cylinder 12 is ensured by a packing ring 39 which may be of any desired type. In the example shown, however, said ring is of the type described in the U. S. patent application Ser. No. 307,863, filed September 4, 1952, by the same applicant, for "Hydropneumatic Accumulators." To avoid a direct transmission to casing 5 of the shock which happens at the end of the active stroke of the jack piston, the shouldering 36 has, as shown at 60, an inner diameter which is smaller than the inner diameter of tube 12, while piston 11 is provided at its right-hand end, as shown in Fig. 1, with a shouldering 59. At the end of the active stroke of piston 11, shouldering 59 abuts against the inner portion 60 of shouldering 36.

According to still another constructive disposition, the movable assembly comprising pinion 1 and the driving member 6 is mounted in casing 5 in two bearings 3 and 4 of different diameters, the diameter of bearing 3 being smaller than that of bearing 4 which is, in turn, slightly larger than the outer diameter of pinion 1. This arrangement ensures a good centering and permits mounting the movable assembly from the right-hand end of the casing (as shown in Fig. 2). Moreover, said arrangement also permits providing a certain clearance between the outer diameter of the driving member 6 and casing 5, which suppresses the risks of jamming which could result from a deformation of the dog-teeth in operation.

According to a further constructive disposition, in order to avoid deterioration of cylinder 12, due to the sliding action of piston 11 which, since it constitutes the body of the rack, has to be made of a very hard metal, there is provided a washer made of a suitably chosen metal 61, the outer diameter of which is slightly larger than the outer diameter of piston 11. Said washer, which acts as a guiding member for said piston, is the only metallic element in contact with the inner wall of the cylinder.

Finally, as shown in Fig. 2, the meshing teeth of the pinion and rack are preferably slightly inclined in such a manner that, during the action stroke of the rack, the pinion tends to be displaced towards the right, which ensures a safe clutching, even if the dog-teeth are slightly deformed.

What is claimed is:
1. A coupling comprising, in combination, a driving rotary member adapted to be shifted axially, a driven rotary member coaxial with said driving member, positive clutch elements on said members inter-engageable upon axial shifting of said driving member, declutching elastic means, clutching elastic means, one of said elastic means being stronger than the other and means to prevent said stronger elastic means for operating in at least one angular position of said driving member.

2. A coupling comprising, in combination, a driving rotary member having at least one resting angular position, and adapted to be shifted axially, a driven rotary member coaxial with said driving member, positive clutch elements on said members inter-engageable upon axial shifting of said driving member, declutching elastic means to urge said driving member into complete disengagement from said driven member, clutching elastic means stronger than said declutching elastic means, a pushing member to shift said driving member into interengagement with said driven member under the action of said clutching elastic means and against the action of said declutching elastic means, abutment means to limit the active stroke of said pushing-member, said driving member having such a shape that said pushing member is capable of acting thereupon only in certain angular positions thereof.

3. A coupling comprising, in combination, a driving rotary member having at least one resting angular position and adapted to be shifted axially, a driven rotary member coaxial with said driving member, positive clutch elements on said members inter-engageable upon axial shifting of said driving member, declutching elastic means to urge said driving member into complete disengagement from said driven member, a pushing-rod having a pointed active end reciprocable in a limited path substantially parallel to the common axis of said driven and driving members, clutching elastic means stronger than said declutching elastic means operatively connected with said pushing-rod to yieldably maintain said pointed end at one limit of said path and in engagement with said driving member so as to move the latter into inter-engagement with said driven member against the action of said declutching elastic means by exerting a direct pressure against a portion of said driving member and a conical recess adapted to receive the active end of said pushing-rod in said resting angular position of said driving member to thereby permit operation of said declutching elastic means.

4. A coupling according to claim 1, in which said positive clutch elements are constituted by inter-engageable dog-teeth provided on both said driving and driven members.

5. A transmission comprising, in combination, a driving rotary member having at least one resting angular position and adapted to be shifted axially, a pinion fast with said driving rotary member, a rack meshing with said pinion and having a resting position corresponding to said driving member resting angular position, a prime-mover operatively connected with said rack, drawback elastic means to return said rack into said resting position when said prime-mover is not operative, a driven rotary member coaxial with said driving member, positive clutch elements on said members inter-engageable upon axial shifting of said driving member, declutching elastic means to urge said driving member into complete disengagement from said driven member, a pushing-rod having a pointed active end reciprocable in a limited path substantially parallel to the common axis of said driven and driving members, clutching elastic means stronger than said declutching elastic means operatively connected with said pushing-rod to yieldably maintain said pointed end at one limit of said path and in engagement with said driving member so as to move the latter into inter-engagement with said driven member against the action of said declutching elastic means by exerting a direct pressure against a portion of said driving member and a conical recess adapted to receive the active end of said pushing-rod in said resting angular position of said driving member to thereby permit operation of said declutching elastic means.

6. A transmission according to claim 5, in which said drawback elastic means are constituted by at least two coaxial coil springs aligned with said rack and acting in parallel thereupon and by at least a further coaxial spring acting on said rack in series with the two first.

7. A transmission according to claim 6, in which said drawback elastic means are housed in a fixed tubular casing having its axis parallel to the direction of displacement of said rack, in which said parallel working springs are interposed between one end of said rack and one closed end of a movable tubular member freely slidable in said fixed tubular casing adapted to receive said rack end and having its other end formed with an outer flange and in which said further spring is interposed between said movable tubular member outer flange and said fixed tubular casing.

8. A transmission according to claim 5, in which the teeth of said rack and pinion are so inclined that, once said driving and driven rotary members are inter-engaged, said driving member is pressed against said driven member upon operation of said rack.

9. A starter for an internal combustion engine having a crank-shaft, comprising, in combination, a hydraulic pneumatic accumulator, a jack including a cylinder adapted to be fed with pressure fluid from said hydraulic pneumatic accumulator and a piston having a predetermined resting position, drawback elastic means to return said piston into said resting position, said piston being formed with rack-teeth, a pinion meshing with said rack-teeth, a driving rotary member fast with said pinion having at least one resting angular position corresponding to said piston resting position and adapted to be shifted axially, a driven rotary member coaxial with said driving member and fast with said crank-shaft, positive clutch means on said members inter-engageable upon axial shifting of said driving member, declutching elastic means to urge said driving member into complete disengagement from said driven member, a pushing-rod having a pointed active end reciprocable in a limited path substantially parallel to the common axis of said driven and driving members, clutching elastic means stronger than said declutching elastic means operatively connected with said pushing-rod to yieldably maintain said pointed end at one limit of said path and in engagement with said driving member so as to move the latter into interengagement with said driven member against the action of said declutching elastic means by exerting a direct pressure against a portion of said driving member and a conical recess adapted to receive the active end of said pushing-rod in said resting angular position of said driving member to thereby permit operation of said declutching elastic means.

10. A starter according to claim 9, in which said pinion is provided with an axial passage adapted to accommodate freely an additional transmission shaft having one end adapted to be operatively connected with said crank-shaft.

11. A starter according to claim 9, in which the stroke of said rack is such that at the end of said stroke, said driving member is in said resting angular position.

12. A starter according to claim 9, comprising a mid-casing adapted to house said pinion and driving member and a portion of said jack cylinder and two terminal tubular casings aligned with each other, symmetrically disposed on either side of said mid-casing, and one of which constitutes the remaining portion of said jack cylinder, while the other is adapted to house said drawback elastic means.

13. A starter according to claim 12, in which said mid-casing comprises two bearings adapted to journal the rotary assembly including said pinion and driving member, said bearings being arranged on either side of said pinion and one of them being disposed between said pinion and driving member and having a diameter larger than that of the other and that of said pinion.

14. In a clutch mechanism, the combination with a rotatable driven clutch member and a rotatable driving clutch member shiftable into and out of engagement with said driven clutch member, of a rod axially movable towards and from said driving clutch member and having a rounded head, a recess formed in the outer end face of said driving clutch member and adapted to receive said head in a predetermined relative position of said rod and said driving clutch member, in which position said driving clutch member is out of engagement with said driven clutch member, first spring means to urge said rod towards said predetermined position, means to prevent axial movement of said rod beyond said predetermined position, and second spring means to yieldably maintain said driving clutch member out of engagement with said driven clutch member, said first spring means being of greater strength than said second spring means, whereby upon rotation of said driving clutch member from said predetermined position said head is cammed out of said recess against the action of said first spring means so as to engage said outer end face of said driving clutch member to shift the latter into engagement with the driven clutch member under the action of said first spring means and against the action of said second spring means.

References Cited in the file of this patent
UNITED STATES PATENTS
2,368,987     Henschker _____ Feb. 6, 1945